United States Patent [19]

McNiel

[11] 4,310,817
[45] Jan. 12, 1982

[54] AUTOMATIC CIRCUIT BREAKING ACCESSORY FOR AN ELECTRIC STORAGE BATTERY

[76] Inventor: Fred A. McNiel, 611 Bouldin Ave., Austin, Tex. 78704

[21] Appl. No.: 146,717

[22] Filed: May 5, 1980

[51] Int. Cl.³ .............................................. H01H 71/46
[52] U.S. Cl. ...................................... 335/13; 335/15; 335/21; 180/284; 307/9; 307/10 R; 307/120
[58] Field of Search .................... 335/131, 6, 9, 10, 11, 335/13, 21, 47, 161, 12, 15, 157; 200/61.45 R; 180/284; 307/10 R, 10 BP, 9, 326, 120

[56] References Cited

U.S. PATENT DOCUMENTS

| | | | |
|---|---|---|---|
| 1,987,495 | 1/1935 | Soulat | 180/82 |
| 2,174,846 | 10/1939 | Soulat | 180/82 |
| 2,192,262 | 3/1940 | Griesedieck | 123/146.5 |
| 2,304,608 | 12/1942 | Smythe | 307/10 BP |
| 2,626,328 | 1/1953 | Lessard | 200/51 |
| 2,823,367 | 2/1958 | Huron | 340/52 |
| 2,986,614 | 5/1961 | Minch | 200/61.5 |
| 3,034,097 | 3/1962 | English et al. | 340/52 |
| 3,042,891 | 7/1962 | Navarro | 339/45 |
| 3,198,899 | 8/1965 | Hitchcock | 200/61.45 |
| 3,215,792 | 11/1965 | Lawyer | 200/61.5 |
| 3,229,109 | 1/1966 | Wilson | 307/10 |
| 3,882,957 | 5/1975 | Fritz | 180/104 |
| 4,000,408 | 12/1976 | McCartney | 307/10 BP |

FOREIGN PATENT DOCUMENTS 814033 6/1937 France .

*Primary Examiner*—L. T. Hix
*Assistant Examiner*—Stafford D. Schreyer
*Attorney, Agent, or Firm*—Jones, Tullar & Cooper

[57] ABSTRACT

An automatic circuit breaker for an electrical storage battery is adapted to be mounted on a battery terminal post so that the battery post forms one contact of the circuit breaker. A latch mechanism holds a contact piston against the battery post to form the main contacts of the breaker, and a solenoid trip mechanism disengages the latch mechanism when energized by a condition responsive switch. An auxiliary switch is provided to be held open by the latch mechanism when the latch mechanism releases the contact piston to open the main contacts of the circuit breaker.

20 Claims, 8 Drawing Figures

AUTOMATIC CIRCUIT BREAKING ACCESSORY FOR AN ELECTRIC STORAGE BATTERY

BACKGROUND OF THE INVENTION

1. Field of Invention

This invention relates, in general, to means for automatically breaking the circuit of an electric storage battery under conditions in which it is desirable to have the battery load disconnected from the battery, and more particularly to a condition responsive circuit breaker adapted to be mounted on a battery terminal post.

2. Description of Prior Art

Heretofore, automatic circuit breakers for batteries have been employed as safety devices in vehicles to disconnect the battery from the vehicle and open ignition circuitry to prevent fires due to the ignition of leaking fuel in the event of an overturn or other serious mishap of the vehicle.

The prior art shows impact switches that can be installed in series with the battery to carry the operating currents of the battery. In particular, U.S. Pat. Nos. 3,215,792 to Lawyer, 3,882,957 to Fritz, and 3,198,899 to Hitchcock show such devices for installation into a vehicle. Although the structures shown in these patents are adequate to perform their desired functions, the structures of these devices require that they be permanently affixed to the vehicle employing the device. Also, with the trend toward smaller cars and the increase of accessories being found in the engine compartment, it may be very difficult to find space to mount the device shown in the above patents. In addition, the installation of the above devices might require the use of special tools, as holes may be required to be drilled into the vehicle body to mount the device. In the Lawyer and Fritz patents, additional heavy duty battery cables are required at additional expense and difficult of installation, and the length required for these additional cables could differ for each vehicle. The device shown in the Hitchcock patent would eliminate the need for an additional battery cable, but the device is still subject to difficulties in installation, as it not only would require space to install it, but additionally the housing must be grounded to the vehicle.

SUMMARY OF THE INVENTION

This invention overcomes the problems associated with the prior art by providing a circuit breaker which is capable of being securely attached to a terminal post of a conventional electric storage battery, thus eliminating location problems on a vehicle employing the battery. The breaker is totally independent of the vehicle upon which the battery is installed except for being influenced by certain conditions which might involve the vehicle.

The circuit breaker comprises a housing having a vertical central bore therethrough, with the bottom end of the bore being adapted to securely receive the battery post of a conventional electric storage battery. The bore accomodates a contact piston having a contact head at its lower end adapted to directly contact the battery post in the closed circuit position of the circuit breaker so that the contact head and the battery post form the main contacts of the breaker. The other end of the piston is adapted to receive the battery cable normally associated with the battery post. The contact piston is mounted on a contact support plate, and the plate is spring biased in an upward direction to hold the contact head of the piston away from the battery post in the open circuit position of the circuit breaker.

The contract support plate is adapted to be engaged by latch hooks to hold the support plate and contact piston assembly in the closed circuit position of the circuit breaker. A solenoid trip mechanism is provided to release the latch hooks upon energization from a condition responsive switch, allowing the spring bias force to move the plate and piston assembly into the open circuit position of the circuit breaker.

An auxiliary switch is also provided to be opened concurrently with the breaking of the main contacts of the circuit breaker. The auxiliary switch is positioned to be actuated by a latch hook arm as the hook moves out of latching engagement with the contact plate.

One advantage of the circuit breaker is its simple and compact structure which allows the breaker to be directly mounted on a battery post to eliminate any location problems; another is its ease of installation which allows the average person to install it quickly and easily without special knowledge or tools.

A further advantage of the circuit breaker of the present invention is that it can be quickly and easily transferred from one vehicle to another without major alterations of either vehicle, thus allowing the breaker to be an accessory for any battery, rather than an accessory for a specific vehicle.

For purposes of this disclosure, a vehicle is defined as being any apparatus utilizing a conventional storage battery, since the present circuit breaker may be mounted on any conventional battery utilized to power an automobile, motor boat, golf cart, portable elevator, etc. However, the circuit breaker is especially suitable for use in a vehicle utilizing an internal combustion engine, as the operation of the circuit breaker will reduce the fire hazard caused by leaking fuel from the engine by opening all electrical circuits in the vehicle.

BRIEF DESCRIPTION OF THE DRAWINGS

The foregoing and additional objectives, features and advantages of the invention will become apparent from the following detailed description of a preferred embodiment thereof, selected for the purpose of illustration and shown in the accompanying drawings, in which.

DETAILED DESCRIPTION OF THE INVENTION

Figure 1:
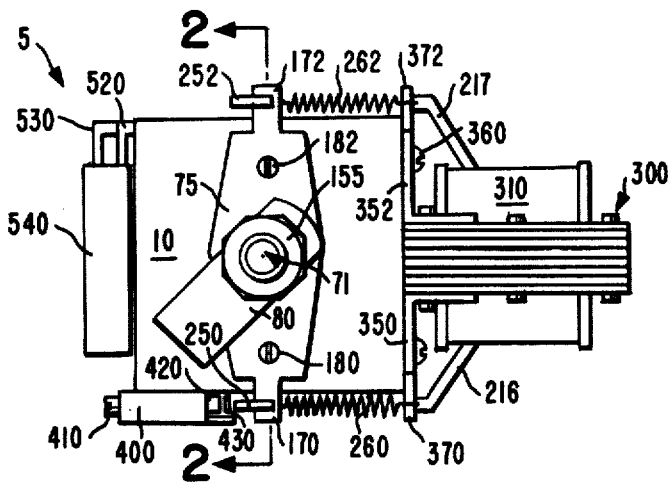
FIG. 1 is a top plan view of the circuit breaker of the present invention in its closed circuit position.

Referring now to the figures, there is shown at 5 a preferred form of a circuit breaker constructed in accordance with the present invention. The breaker includes a housing 10, made of "Bakelite" or equivalent material, with a substantially cylindrical bore 20 shown centrally located in the housing 10 in FIGS. 2A and 2B. The lower portion of bore 20 defines a socket 22 to receive a battery terminal post 30 of a conventional electric storage battery 35, the socket 22 being adapted in any fashion, such as with a taper 25, to snugly receive the battery post 30. A sealing gasket 40 may be placed around battery post 30 before installing the breaker 5 to prevent moisture and air from reaching post 30 through any gap between housing 10 and battery 35. Set screws 50 and 52 are threaded into tapped holes 54 and 56 through housing 10 to securely lock the housing into position on the battery post.

The upper section 60 of bore 20 receives a stem portion 70 of a contact piston 71. Stem 70 extends out of upper bore 60 through an aperture 72 formed in a contact support plate 75. Stem 70 of piston 71 is threaded at its upper end 76 to define a terminal for the circuit breaker which is adapted to receive a conventional battery cable 80 normally associated with battery post 30.

Figure 2A:
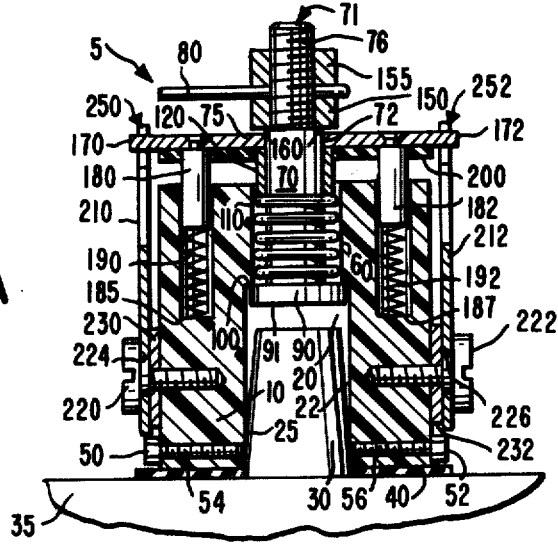
FIG. 2A is a cross-sectional view of FIG. 1 taken along line 2—2 and showing the circuit breaker in the open circuit position.
Figure 2B:
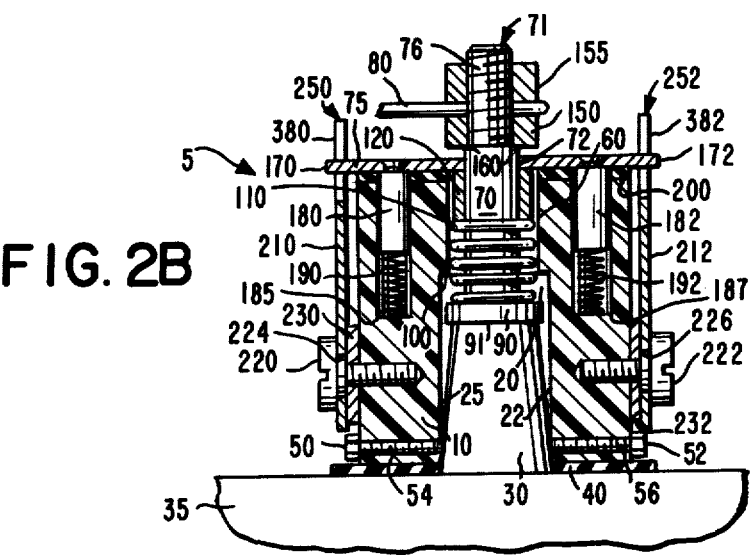
FIG. 2B is the cross-sectional view of FIG. 2A, but showing the circuit breaker in its closed circuit position.

Piston 71 is equipped with a contact head 90 at its lower end having a flat face 91 adapted to contact the top of battery post 30 when the circuit breaker is in its closed position, as shown in FIG. 2B. As shown in FIGS. 2A and 2B, upper bore 60 has a smaller cross-sectional area then socket 22 so as to define a stop 100 for contact head 90 to limit the upward travel of contact piston 71 as it assumes the open circuit of FIG. 2A. Although bore 20 and piston 71 are illustrated as being substantially cylindrical, it will be understood that they may take any cross-sectional shape as long as they cooperate in the same manner illustrated.

Piston spring 110 and guide sleeve 120 are located around stem 70 between contact head 90 and contact support plate 75. Nut 150 is turned down on the threaded terminal 76 of stem 70, against the upper surface of support plate 75, to cooperate with guide sleeve 120 to place spring 110 under slight compression against contact head 90. Shoulders 160 defined by the end of threads 76 on stem 70 are positioned so as to place spring 110 under proper compression when nut 150 is turned down the entire length of threads 76. Alternatively, guide sleeve 120 may be eliminated and support plate 75 may directly compress spring 110.

Battery cable 80 is secured to threaded terminal 76 with nut 155. Alternatively, nut 155 may be shaped to resemble battery post 30 so as to allow cable 80 to be mounted by means of a conventional battery cable terminal (not shown). Also, interchangeable nuts of various shapes may be provided with the breaker for easy transfer of the breaker between vehicles having batteries with different terminal connections. It is understood that the above fastening means of cable 80 to piston terminal 76 is by way of illustration only, and that any conventional fastening means for the cable falls within the scope of the present invention.

In FIG. 1, contact support plate 75 is shown as an elongated plate extending across the top of housing 10 and having ears 170 and 172 adapted to be engaged by suitable latch members to hold the plate and contact piston assembly in the closed circuit position of FIG. 2B. As illustrated in FIGS. 2A and 2B, a pair of downwardly protruding compressors 180 and 182 are attached to the bottom of plate 75 on opposite sides of aperture 72 and extending into a pair of corresponding wells 185 and 187 formed in housing 10. The compressors 180 and 182 extend partially into wells 185 and 187, respectively, and are biased upwardly by a pair of bias springs 190 and 192, respectively, located within the wells which function to shift the support plate and contact piston assembly upwardly to the position shown in FIG. 2A when the switch is opened. As stated above, the upward travel of the assembly is limited by the seating of contact head 90 against stop 100.

An oiled felt sealing gasket 200 with perforations for guide sleeve 120 and spring compressors 180 and 182 may be placed between contact support plate 75 and housing 10 to prevent air and moisture from entering into bore 20 through any gap that might exist between plate 75 and housing 10 when the breaker is in the closed circuit position of FIG. 2B, thus reducing the possibility of corrosion of the main contacts 90 and 30.

The breaker is moved from its open position in FIG. 2A to its closed position in FIG. 2B by manually pressing contact support plate 75 downwardly against the force of springs 185 and 187 until contact head 90 abuts battery post 30. Additional downward pressure causes plate 75 and guide sleeve 120 to slide down stem 70 and place spring 110 under further compression to bias contact head 90 firmly and positively against battery post 30 to assure maximum current output of the battery. Similar compression of springs 190 and 192 by compressors 180 and 182 causes the plate and contact assembly to be biased upward toward the position shown in FIG. 2A when the assembly is not latched into the closed position of FIG. 2B.

Figure 3:
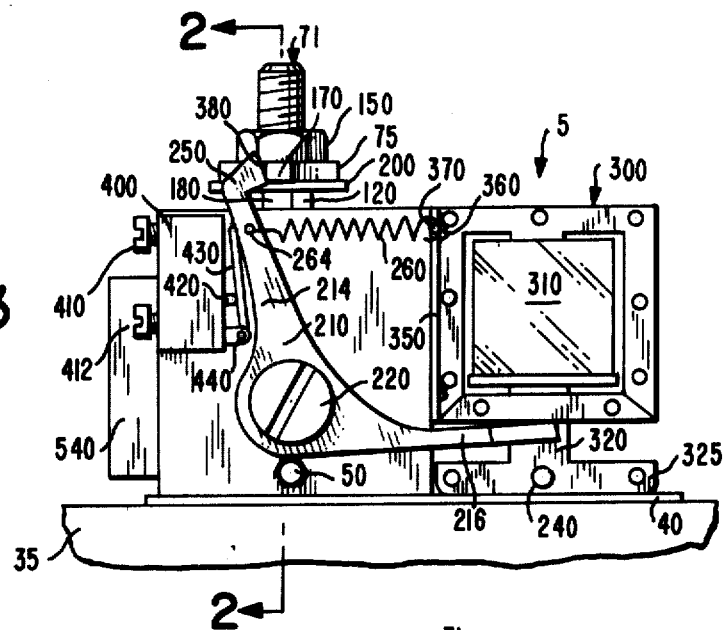
FIG. 3 is a side elevation view of the unit in its closed circuit position.
Figure 5:
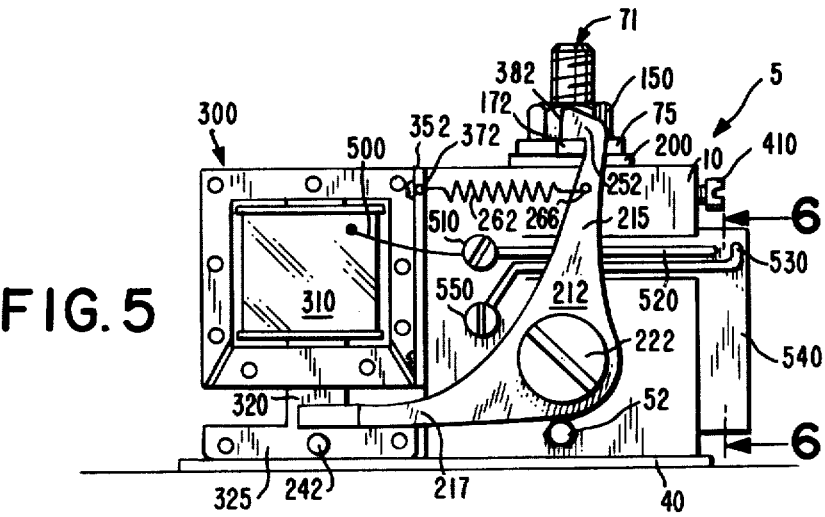
FIG. 5 is an elevation of the side opposite that shown in FIG. 3 with the breaker in the closed position.

FIGS. 3 and 5 best depict the mechanism for latching the breaker in the closed position. The breaker is provided with a pair of generally L-shaped latch members 210 and 212 having upper latch arms 214 and 215 and lower latch arms 216 and 217, respectively. Latch member 210 is pivotally mounted to the side of housing 10 at the junction of latch arms 214 and 216 by pivot screw 220. Latch member 212 is similarly connected to housing 10 at the junction of latch arms 215 and 217 by pivot screw 222. As best shown in FIGS. 2A and 2B, latch members 210 and 212 are mounted on shoulders 224 and 226 of screws 220 and 222, which are threaded into housing 10. Shoulders 224 and 226 are of a proper dimension to allow latch members 210 and 212 to rotate freely in the slots defined by the screw heads and spacing washers 230 and 232, without wobbling.

Figure 4:
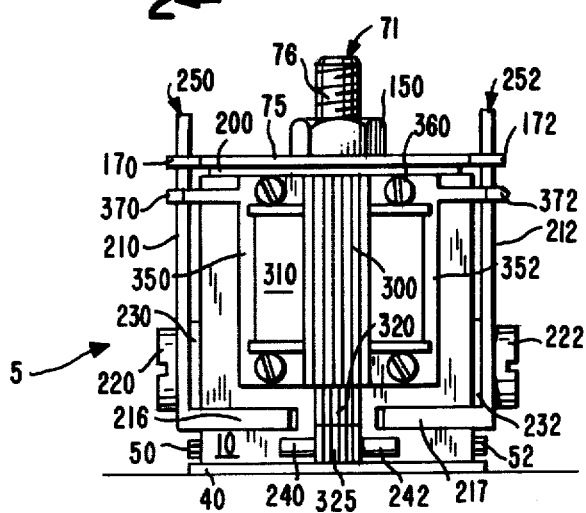
FIG. 4 is an end elevation of the device of FIG. 1 showing the solenoid trip mechanism for the circuit breaker with the breaker in its closed circuit position.

As best shown in FIGS. 1 and 4, lower latch arms 216 and 217 are bent around housing 10 so as to be positioned above drive pins 240 and 242 of a trip mechanism to be described.

Upper latch arms 214 and 215 have latch hooks 250 and 252 adapted to engage ears 170 and 172, respectively, of contact support plate 75 as shown in FIGS. 1, 2B and 5, to latch the plate and contact assembly in the closed position of FIG. 2B. Latch members 210 and 212 are biased toward the engaged position by latch springs 260 and 262 which are suitably attached thereto through apertures 264 and 266 in the upper latch arms 214 and 215, the opposite sides of the springs being attached to the housing 10 in a manner to be described. The dual spring biased latch members 210 and 212 prevent vibration or jolting from accidently tripping the circuit breaker prior to the release of the latch members by the trip mechanism, thus assuring that all battery load circuits remain fully energized until a predetermined condition or conditions energize the trip mechanism to automatically open the breaker.

In its preferred form the trip mechanism comprises a solenoid 300 having a coil 310 and an armature 320 with drive pins 240 and 242 being mounted on the lower end of armature 320 as best shown in FIGS. 4 and 5. A weight 325 mounted on the lower end of armature 320 holds the armature down so it rests on gasket 40 when the solenoid coil 310 is not energized, to prevent vibration from accidentally lifting the armature and tripping the latch members.

Solenoid 300 includes mounting brackets 350 and 352 by which the solenoid is mounted on housing 10 with screws 360. As best shown in FIG. 4, the mounting brackets may have fingers 370 and 372 protruding beyond the corners of housing 10 to provide a means for attaching the ends of bias springs 260 and 262 to housing 10, as indicated above.

When coil 320 is energized, armature 320 is pulled up, lifting drive pins 240 and 242 into striking engagement with lower latch arms 216 and 217 to pivot latch members 210 and 212 about screws 220 and 222, thereby moving hooks 250 and 252 away from ears 170 and 172 to release the plate 75 and to allow piston 71 to move upwardly to its open position shown in FIGS. 2A and 3. The upward motion of plate 75, and thus of ears 170 and 172, is limited by the seating of contact head 90 against stop 100 as shown in FIG. 2A. The location of this stop is so arranged that the plate 75 will travel upwardly sufficiently far to cause faces 380 and 382 of latch hooks 250 and 252 to abut the sides of ears 170 and 172 under the bias force of springs 260 and 262 after the breaker has been opened and the solenoid deenergized to allow armature 320 to return to its rest position, as shown in FIG. 3. The solenoid is deenergized after releasing the latch members because the circuit utilized to energize the coil 310 is broken by the opening of the main contacts 90 and 30, and this allows armature 320 to fall back to its rest position after releasing the latch mechanism.

The breaker 5 preferably incorporates an auxiliary switch 400 having a pair of screw terminals 410 and 412 as best shown in FIG. 3. The auxiliary switch is provided to break low current circuits which may not be deactivated by the opening of main contacts 90 and 30. For instance, if the breaker is employed in a vehicle having an internal combustion engine with an alternator, the breaking of the battery circuit would not cut off the engine, since the alternator would continue to supply the necessary power to the ignition circuit and fuel pump. This could result in the ignition of leaking fuel if the vehicle is involved in a serious mishap. Auxiliary switch 400 may be placed in series with these circuits through terminals 410 and 412 to break the circuits whenever the main contacts of the breaker are opened.

In its preferred form, auxiliary switch 400 is a conventional microswitch provided with a plunger 420 extending from the switch housing, with an actuation lever 430 pivotally mounted at 440 on the switch housing. Lever 430 is positioned next to upper latch arm 214 so that it is engaged by the latch arm concurrently with the tripping of the main contacts 90 and 30 previously described.

As shown in FIG. 3, latch arm 214 holds lever 430 against plunger 420 so as to open the circuit between terminals 410 and 412 when the breaker is in its open circuit position. Latch arm 214 holds switch 400 in its open circuit position when the main contacts are opened because of the engagement of latch hook face 380 against the side of ear 170, as previously described. It should be understood that when the main contacts 90 and 30 are closed, as shown in FIG. 2B, latch arm 214 pivots out of engagement with lever 430 as hook 250 assumes its latching position over ear 170, thereby allowing switch 400 to assume its normally closed position, as best shown in FIG. 1.

The energization means for the solenoid 300 is best depicted in FIG. 5, wherein the solenoid coil 310 is shown as having a lead 500 attached to terminal 510. The opposite end of the coil 320 (not shown) may be connected to solenoid brackets 350 and 352 and through springs 260 and 262, latch arms 214 and 215, and plate 75 to piston 71 and battery post 30, which preferably is the ground terminal of the battery. Terminal 510 is connected to the opposite terminal of the battery, which in the preferred use of the present invention is the positive terminal, via leads 520 and 530 of condition responsive switch 540, to a terminal 550, and by way of a suitable connection from terminal 550 to the positive supply of the battery (not shown).

Condition responsive switch 540 preferably is attached to the housing 10 on the side opposite the location of solenoid 300. Switch 540 may be responsive to impact and/or overturn of the vehicle employing the invention, or to any other condition which might require disconnection of a battery from its load, and serves to close the circuit between terminals 510 and 550 upon such conditions to connect solenoid coil 310 across the battery supply, thereby tripping the circuit breaker.

Figure 6:
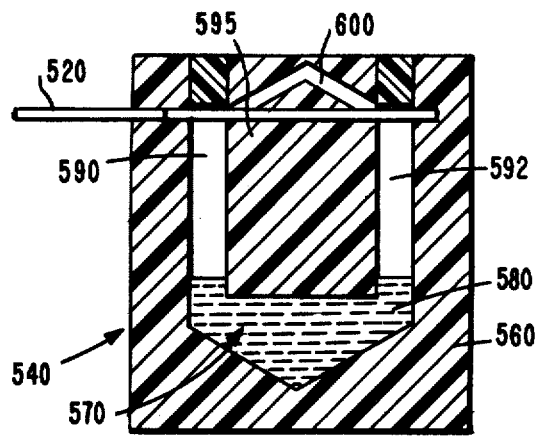
FIG. 6 shows a cross-section of a preferred embodiment of a condition responsive switch, the section taken along line 6—6 of FIG. 5.

It its preferred form, switch 540 is responsive to impact and overturn of a vehicle equipped with the circuit breaker of the present invention, and is best shown in FIG. 6, which is a sectional view taken along line 6—6 of FIG. 5. The switch includes a hermetically sealed housing 560 having a lower chamber 570 containing mercury 580. A pair of vertical channels 590 and 592 located on either side of a central housing divider wall 595 open into chamber 570 at their lower ends, and are connected to each other by a pressure relief passageway 600 at their upper ends. Bare leads 520 (and 530, not shown) extend through housing 560 into the upper ends of channels 590 and 592 and are spaced parallel with one another.

In operation, when a vehicle equipped with the circuit breaker of the present invention is impacted from either side of the switch by a force predetermined magnitude, the inertia of the mercury 580 will cause it to flow up either channel 590 or 592, depending on which side the vehicle is impacted, bridging space leads 520 and 530 to close the solenoid circuit and trip the breaker. Passage 600 relieves back pressure caused by the rising column of mercury in either chamber. In the event that the vehicle should be upset without a major impact being involved, inversion of switch 540 will cause the mercury 580 to flow downward by gravitational force into channels 590 and 592 and bridge spaced leads 520 and 530 to close the solenoid circuit.

Since the impact force of a vehicle possessing the breaker may tend to be greater in one direction than the other, it may be desirable to vary the relative capacities of channels 590, 592 and the amount of mercury 580 so as to select the actuation force required to operate the impact switch from either side. Since the activation force required to operate the switch is controlled by the ratio of inertia force generated by the mercury in chamber 570 versus the weight of the mercury lifted in either of the channels, and since the weight of mercury lifted is directly proportional to the capacity of each channel, the amount of force required to actuate the impact switch is easily determinable.

Although the impact switch shown in FIG. 6 is preferred, the present invention anticipates the use of any other form of impact switch which may serve the same function of energizing the solenoid circuit. For example, an alternative impact switch may be made responsive to impact from all sides by utilizing an annular vertical chamber around the central wall 595. It is also anticipated that other condition responsive switches may be substituted for the impact switch; for example, a switch responsive to temperature, elapsed time, or even a manual push-button switch may be substituted or combined with the impact switch to close the circuit between the terminals 510 and 550 without departing from the spirit of the invention.

Figure 7:
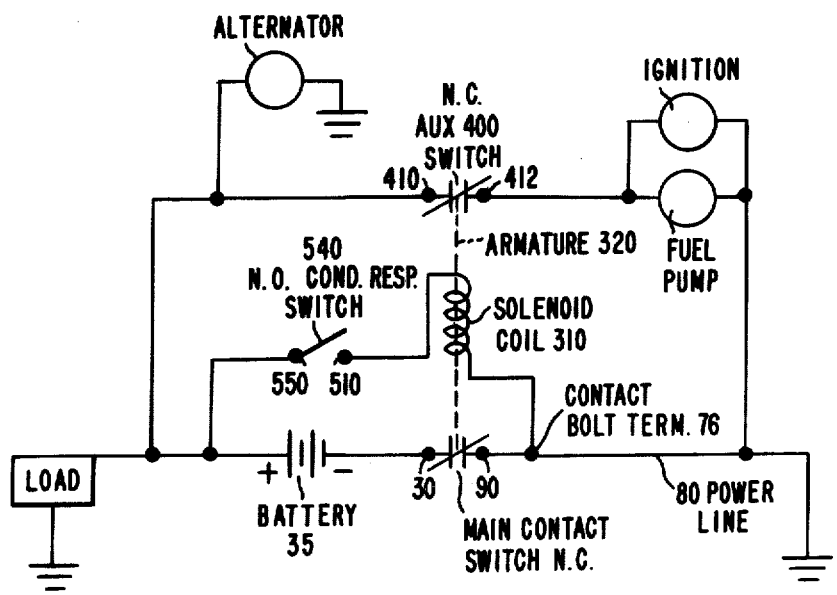
FIG. 7 is a schematic diagram showing the incorporation of the invention into an electrical system.

FIG. 7 is an electrical schematic of the invention as it may be employed in a vehicle equipped with an internal combustion engine, with like numbers referring to like elements of the previous description. In their operating positions the normally closed main contacts 90 and 30 and auxiliary switch 400 allow power to be delivered to their respective load circuits. Normally open condition responsive switch 540 may then close upon some predetermined condition, thereby energizing the solenoid coil 310, causing armature 320 to open the normally closed switches and remove the load circuits from the battery until the breaker is manually reset.

Installation of this circuit breaker is exceedingly simple and requires no special mechanical knowledge or tools. In fact, most vehicle operators could very easily perform the installation in a satisfactory manner. To install the breaker, a battery cable 80 is removed from a battery terminal post 30, the breaker 5 is then slipped onto the battery post and turned into such a position that impact switch 540 will respond to predetermined directions of impact, the set screws 50 and 52 are tightened, and the battery cable 80 is attached to the circuit breaker contact piston terminal 76. It is then a simple job to connect the ignition and fuel pump circuits to the auxiliary switch terminals 410 and 412 and connect condition responsive switch terminal 550 to the other battery terminal.

After the unit has been installed and all leads properly connected, the contact support plate 75 is manually depressed to allow the latch hooks 250 and 252 to snap into latching position over ears 170 and 172 on the support plate 75 to hold the circuit breaker firmly closed and deliver maximum battery current output at all times, until the vehicle is involved in a mishap of sufficient magnitude to close the condition responsive switch and energize the solenoid 300 to open all electrical circuits of the vehicle. Alternatively, the circuit breaker can be opened by manually pivoting latch hooks 250 and 252 out of latching engagement with the support plate ears 250 and 252.

Thus, there has been disclosed a simple, compact and reliable circuit breaker accessory for an electric storage battery, which is easily and quickly installed by the average person with a minimum of special tools or knowledge, without the location problems associated with the prior art. Although the present invention has been disclosed in terms of a specific embodiment, it will be understood that modifications and variations can be made which are within the skill of the art without departing from the true spirit and scope of the invention as described in the following claims.

What is claimed is:

1. An automatic circuit breaker for an electric storage battery having a terminal post, comprising:
   a housing;
   a bore passing through said housing, said bore having first and second portions in said housing, said first portion of said bore adapted to receive the terminal post;
   a piston having first and second ends, said first end of said piston being adapted to receive a battery cable;
   mounting means for said piston adapted to slidably position said second end of said piston in said first portion of said bore;
   bias means adapted to slide said second end of said piston toward said second portion of said bore;
   latch means adapted to engage said mounting means to position said second end of said piston in contact with the battery post; and
   trip means adapted to disengage said latch means from said mounting means, thereby allowing said bias means to slide said second end of said piston toward said second portion of said bore and out of contact with the battery post.

2. The apparatus of claim 1, wherein said bore includes a stop means to limit sliding motion of said second end of said piston away from the battery post.

3. The apparatus of claim 1, wherein said first portion of said bore is larger in cross-sectional area than said second portion of said bore.

4. The apparatus of claim 1, wherein said second end of said piston is larger in cross-sectional area than said second portion of said bore.

5. The apparatus of claim 1, wherein said piston includes a stem slidably positioned in said second portion of said bore, said stem extending between said first end and second end of said piston.

6. The apparatus of claim 5, wherein said mounting means comprises a plate having an aperture adapted to receive said stem.

7. The apparatus of claim 6 further including a piston spring surrounding said stem between said plate and said second end of said piston.

8. The apparatus of claim 7, wherein said first end of said piston includes means to pull said stem through said aperture, thereby compressing said piston spring between said plate and said second end of said piston.

9. There apparatus of claim 6, wherein said bias means comprising at least one bias spring between said housing and said plate.

10. The apparatus of claim 9, wherein said plate includes a spring compressor to compress said bias spring, and said housing includes a well to receive said spring and said spring compressor.

11. The apparatus of claim 1, wherein said latch means includes means to bias said latch means into engagement with said mounting means.

12. The apparatus of claim 11, wherein said latch means comprises at least one latch member pivotally supported on said housing.

13. The apparatus of claim 12, wherein said latch member comprises first and second latch arms, said first latch arm including a hook adapted to engage said mounting means, said latch member being pivotally supported on said housing at the junction of said first and second latch arms.

14. The apparatus of claim 13, wherein said latch bias means comprises a latch spring connected between first latch arm and said housing.

15. The apparatus of claim 13, wherein said second latch arm is adapted to be engaged by said trip means to pivot said first latch arm out of engagement with said mounting means.

16. The apparatus of claim 1, wherein said trip means comprises a solenoid having a coil and an armature, said coil being adapted to cause said armature to disengage said latch means from said mounting means upon energization of said coil.

17. The apparatus of claim 16, further comprising a condition responsive switch means in circuit with said solenoid coil, said switch being adapted to energize said coil upon a predetermined condition.

18. The apparatus of claim 17, wherein said condition responsive switch means comprises a mercury impact switch including a lower chamber containing mercury, first and second vertical channels which communicate with said chamber at the lower ends of said channels, a passageway connecting the upper ends of said vertical channels to relieve back pressure in said channels, and a pair of spaced electrical conductors extending into the upper ends of said first and second vertical channels adapted to be electrically connected by said mercury.

19. The apparatus of claim 1 further including an auxiliary switch adapted to be actuated by said latch means as the latch means is disengaged from said mounting means.

20. The apparatus of claim 19, wherein said auxiliary switch is adapted to be held in its open position by said latch means after the circuit breaker is tripped.

* * * * *